United States Patent
Fleming et al.

[11] 3,718,418
[45] Feb. 27, 1973

[54] CO SHIFT PROCESS

[75] Inventors: Donald Kingsley Fleming, Park Ridge; Sarabjit Singh Randhava, Evanston; Elias Humberto Camara, Hickory Hills, all of Ill.

[73] Assignee: Institute of Gas Technology, Chicago, Ill.

[22] Filed: Sept. 1, 1970

[21] Appl. No.: 68,633

[52] U.S. Cl. ............ 423/415, 23/230 R, 136/86 D
[51] Int. Cl. ............ C01b 31/18, H01m 27/10
[58] Field of Search ........... 23/204 M, 230 A, 230 R; 136/86 B, 86 D; 423/415

[56] References Cited

UNITED STATES PATENTS

| | | |
|---|---|---|
| 1,831,179 | 11/1931 | Jaeger ........................... 23/204 M |
| 3,357,863 | 12/1967 | Ziering ........................... 136/86 D |
| 3,364,072 | 1/1968 | Barber ........................... 136/86 D |
| 2,013,727 | 9/1935 | Douglass et al .................. 23/230 A |

Primary Examiner—Oscar R. Vertiz
Assistant Examiner—Hoke S. Miller
Attorney—Molinare, Allegretti, Newitt & Witcoff

[57] ABSTRACT

Process of conversion of $CO_2$ to $CO$ in the presence of hydrogen, using catalysts of Rh and Ru metals, and alloys thereof with Pt, the Rh metals and alloys being beneficated with admixtures of reduced, amorphous tungsten or molybdenum oxides, and the Ru metals and alloys being beneficated by the molybdenum oxide only. Precise control of the product gas composition is obtained by predetermined control of process parameters of input gas flow rate and temperature conditions in the shift reactor.

11 Claims, 5 Drawing Figures

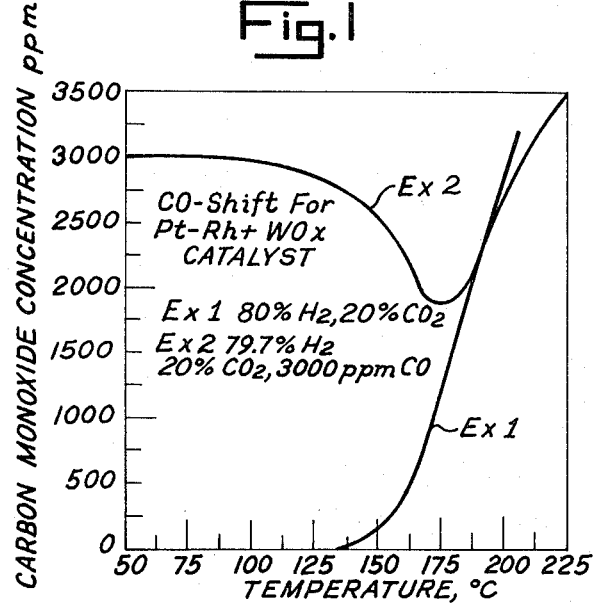
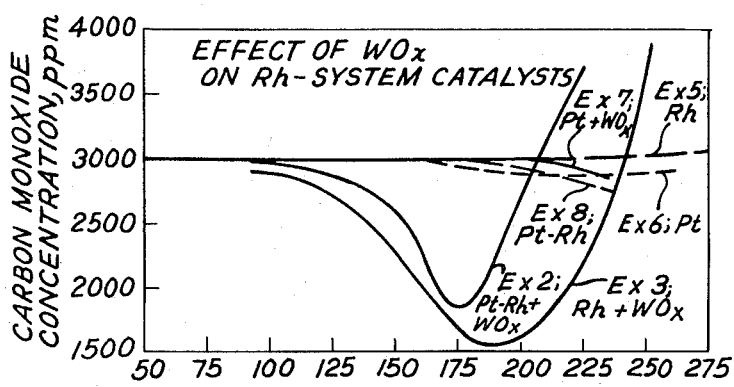

INVENTOR
DONALD K. FLEMING,
SARABJIT S. RANDHAVA &
BY ELIAS H. CAMARA

Molinare, Allegretti, Newitt & Witcoff
ATTORNEYS

CO SHIFT PROCESS

FIELD OF THE INVENTION

This invention relates to improved methods of reacting carbon dioxide with hydrogen to form CO and water according to the CO-shift reaction: $CO_2 + H_2 \rightleftarrows CO + H_2O$. More specifically, this invention relates to the method of use of multi-component catalysts containing ruthenium or rhodium, with or without platinum, and which catalysts are beneficated with tungsten oxide or molybdenum oxide. These catalysts promote the reaction at lower temperatures and promote the reaction to significantly greater extent than prior catalysts. The CO-containing product gas is useful for hydrocarbon manufacture via Fischer-Tropsch synthese.

BACKGROUND OF THE PRIOR ART

Heretofore, many kinds of metallic catalyst have been utilized in various supported and non-supported forms to promote the reaction of carbon dioxide with hydrogen to form CO and water, and the reverse of that reaction for cleaning up reformer gas. Heretofore, however, most of the existing catalysts have operated at relatively high temperatures, in the range of above 275°C.

In a different field, multi-component fuel cell electrodes under conditions of electrical potential have been used to oxidize hydrogen with oxygen in the presence of a sulfuric acid electrolyte in the presence of carbon monoxide impurities. For example, the U.S. Pat. No. 3,357,863 discloses the use of rhodium catalyst containing tungsten oxide as such an electrode at 150°C in the presence of 10 percent carbon monoxide over a phosphoric acid electrolyte. The patent discloses up to 50 percent of the rhodium may be substituted by platinum or palladium. Similarly, in U.S. Pat. No. 3,364,072, four-component electrode compositions of platinum and rhodium with tungsten and molybdenum oxide additives are disclosed as showing improved fuel cell performance in terms of current density at relatively lower percent carbon monoxide impurity, 0.1 – 1.0 percent, and somewhat lower temperatures, on the order of 70°C. Again, hydrogen was used as the fuel, oxygen was used as the oxidant, the electrolyte was sulfuric acid, and the electrode was tested under various voltages ranging from 0.7 to 0.85 volts.

It was also known from these two aforementioned patents, that platinum black operated somewhat better as an electrode under some of the low carbon monoxide conditions than platinum beneficated by either the molybdenum oxide or tungsten oxide. These results tend to indicate that, typical of the field, the operability of electrode compositions is relatively unpredictable. In our own work evaluating such electrode compositions for operability in different gas feeds, specifically, a fuel containing 79.7 percent hydrogen, 20 percent carbon dioxide, and 0.3 percent carbon monoxide, it was determined that at steady state conditions of a test fuel cell at 150°C, there was no significant change in the carbon monoxide concentration in the fuel cell effluent as compared to the input feed. This is discussed in more detail in the comparative examples below. This work tends to indicate that there is no effective chemical reaction of CO in the operating fuel cell, the carbon monoxide concentration in the effluent agreeing with the value predicted by material balance, calculated on the basis of hydrogen consumed in the manufacture of the electricity in the fuel cell.

OBJECTS OF THE INVENTION

It is among the objects of this invention to provide methods for reversibly converting carbon dioxide to CO.

It is another object of this invention to provide a method for converting gas which contains impurities of carbon dioxide to produce a product gas high in CO, which in turn can be methanated so there is substantially no CO or $CO_2$ therein.

It is another object of this invention to provide a method of producing a product gas which may be utilized as an improved feed-gas for fuel cells, for ammonia synthesis, or for standard Fischer-Tropsch reaction processes for the synthesis of hydrocarbons.

It is another object of this invention to provide improved reversible CO-shift processes which have reduced operating temperatures, which mitigate the severity of the reaction, minimize the reactor size, and have more favorable thermodynamic equilibria.

It is another object of this invention to provide a CO-shift and methanation process which may be used alone, or in conjunction sequentially with electrochemical reactions which unlike the process of this invention, may be under an electrical potential.

Still further objects of this invention will be evident from the detailed description which follows.

THE INVENTION

Summary

Surprisingly, we have discovered methods of reversibly converting carbon dioxide to CO by reaction with hydrogen by the use of rhodium or ruthenium metals, heretofore used as electrodes, as catalysts in said reactions when not under electrical potential. The rhodium and/or ruthenium may be used with or without platinum, but must have minor amounts of tungsten and/or molybdenum oxide admixed therewith which have a synergistic effect. We prefer the catalyst mixtures without platinum. In addition, the CO-shift activity is unexpected in view of the fact that tests show that there is no net effective CO chemical reaction in the operating fuel cell using such materials under electrical potential as electrodes.

The compositions of our catalysts employed in this method are not per se part of this invention, being heretofore known as electrode compositions. However, these compositions have not been known or used as catalysts in the CO-shift methods of this invention.

In contrast to the utility of platinum black as an effective electrode at low carbon monoxide concentrations as set forth in the above prior art, we have discovered that the pure metals, platinum, rhodium and ruthenium, are relatively inert in the CO-shift processes of this invention. Likewise, the alloys of rhodium - platinum and ruthenium - platinum, ruthenium or platinum with tungsten oxide, and ruthenium - platinum with tungsten oxide are ineffective.

We have discovered that the activity of our catalyst combinations follow the general rule: rhodium - platinum alloy plus tungsten oxide is the most active, followed by rhodium plus tungsten oxide, followed by ruthenium y platinum alloy with molybdenum oxide, followed by rhodium - platinum alloy with molybdenum oxide, and then ruthenium plus molybdenum oxide. Comparison of the catalysts that are effective with those that are not effective show the synergism of the molybdenum and tungsten oxides and their high specificity.

Precise control of the product gas composition resulting from our CO-shift processes can be obtained by predetermined and preselected control of the process parameters, particularly the input gas flow rates and the temperature conditions of the reactor. While some of the CO produced in our process can methanate with hydrogen in the feed gas, at preselected temperatures the $CO_2 \rightarrow CO$ shift is so predominant that the methanation is effectively small and for practical purposes may be ignored. However, in another aspect of our invention methanation may proceed simultaneously with the CO-shift, and in still another aspect of our invention, the CO-shift may be run at one temperature, and the complete methanation thereafter run at a lower temperature.

The feed gases employed contain hydrogen and substantial amounts of $CO_2$, ranging from a few parts per million up to the stoichiometric equivalent amount of hydrogen (essentially 50 percent by volume). A typical gas contains 20% $CO_2$, which is exemplary of reformer product gas. In addition, the feed gas may contain a small amount of CO, up to about 5 – 10 percent, typically 0.1 – 1.0 percent. In the latter case, the CO-shift lags about 5°C or less behind equivalent conversion where CO is initially absent from the feed gas.

THE FIGURES

In the following detailed description, reference will be had to the drawings, in which:

FIG. 1 is a graphical representation of the change in carbon monoxide concentration with temperature as the CO-shift reaction of our process is catalyzed by the synergistic effect of tungsten oxide on a rhodium - platinum catalyst for two types of feed gas;

FIG. 2 shows the synergistic effect of tungsten oxide on rhodium system catalysts of this invention;

Figure 4:
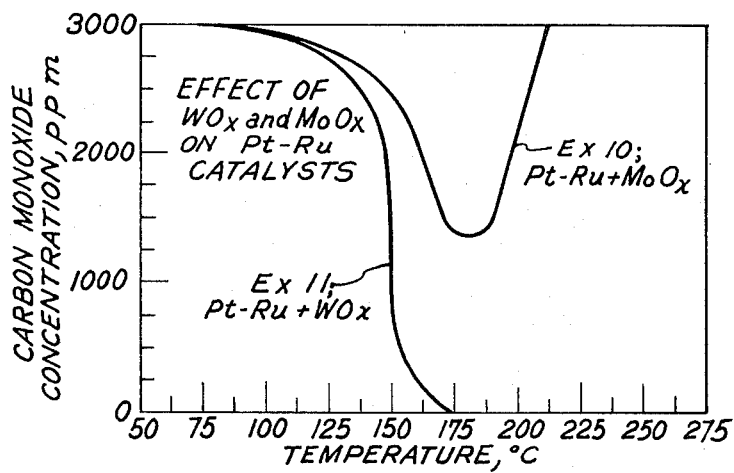
Figure 5:
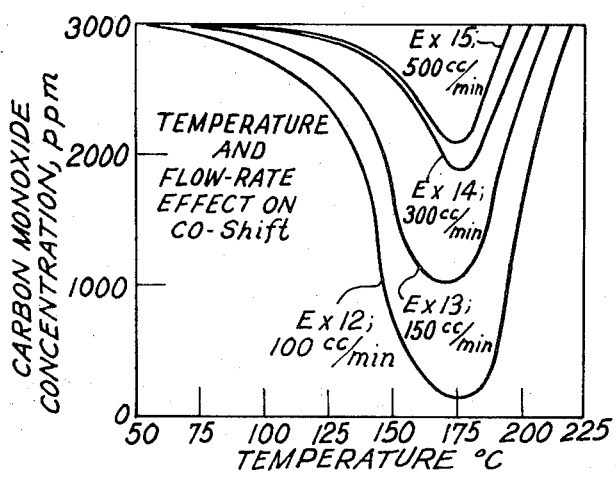

FIG. 4 graphically illustrates the synergistic effect of tungsten oxide and molybdenum oxide on ruthenium - platinum catalysts;

FIG. 5 graphically illustrates the flow rate and temperature relationship for a tungsten oxide beneficated rhodium - platinum catalyst in the CO-shift process of this invention.

DETAILED DESCRIPTION AND EXAMPLES

We have discovered that certain known metallic materials used heretofore as electrodes, when employed in a reactor as a catalyst, have the unexpected property of converting carbon dioxide-containing feed gases at temperatures above about 175°C, and preferably in the range of about 200 – 500°C. There is a substantial portion of hydrogen in the inlet feed gas composition, as for example, in a product gas from a reforming process just upstream from the methanation process of this invention. At the lower temperatures in the range of 175 – 225°C some methane may be produced from the CO, and at temperatures above about 200 – 225°C the CO production strongly predominates. By control of the temperature and flow rate of the input gas in our process, we are able to control the carbon monoxide output from the carbon dioxide shift.

We can then change the conditions in our reactor and thereafter methanate the CO, if desired. The methanation of the CO, per se, is disclosed and claimed in our copending application Ser. No. 68,632, filed of even date. The methanation process of that invention may be used in conjunction with the CO-shift of this application.

For temperatures in the range of 175 – 500°C, we may use a flow rate of up to about 1 liter/min., and prefer to employ a flow rate on the order of 100 – 500 cc/min. However, it should be understood that as the flow rate of the gas through our reactor is reduced, the temperature of the CO-shift may be increased above 175°C and the CO-shift controlled thereby. Thus, by control of the flow rate and temperature, we can control the output composition of the product gas from our process.

Our preferred mode of operation of the process of this invention is the production of a gas which contains carbon monoxide, useful inter alia in the production of hydrocarbons in standard Fischer-Tropsch syntheses. Or the CO-containing gas may be methanated by the process shown in our copending application Ser. No. 68,632. The gas resulting from that process is useful in ammonia synthesis plants, and for use as fuel for various types of fuel cells, both low and high temperature fuel cells.

Surprisingly, we have found that pure metal and alloy electrode materials, platinum, rhodium and ruthenium and alloys thereof, when attempted to be employed in our process as a CO-shift catalyst show substantially no activity for the CO-shift in the low temperature ranges employed in our process. For example, some seven combinations of platinum - ruthenium "alloy", varying from 100 percent platinum to 100 percent ruthenium showed no activity. Similarly, the use of platinum or ruthenium beneficated by small percentages of tungsten oxide shows substantially no promotion of CO-shift.

The catalyst mixtures preparation is set forth in more detail below. The tungsten oxide and molybdenum oxide produced in the preparation procedures are not characterizable as $WO_3$, $W_2O_5$, or $MoO_2$. Rather, they are amorphous, reduced oxides which are hereinafter referred to as $WO_x$ and $MoO_x$ for brevity.

In contrast, we have discovered that the most effective catalyst for use in the CO-shift process of this invention is a rhodium-platinum alloy catalyst beneficated with a synergistic amount of tungsten oxide, hereinafter referred to as $Rh - Pt + WO_x$ for brevity. The next best material functioning as a catalyst in the process of this invention is rhodium which is beneficated by a synergistic amount of tungsten oxide, hereinafter $Rh + WO_x$.

FIG. 1 shows the CO-shift activity for feed gases in which CO is present or absent, for the most active catalyst of this invention, $Pt - RH + WO_x$. Where the CO is initially present (the upper curve), there is a dip in CO concentration, due to a methanation effect not part of this invention but disclosed and claimed in our aforesaid copending application, which masks the CO-shift up to about 165°C where the slope of the curve begins to change from negative to positive. Thereafter, the shift reaction predominates. The shift activity is clear for the CO-free initial feed gas (lower curve).

The $Rh + WO_x$ catalyst falls about 40–45°C behind the $Pt - Rh + WO_x$ catalyst in terms of CO-shift activity; that is, the same CO-shift rate occurs about 40–45°C higher for $Rh + WO_x$ than $Pt - Rh + WO_x$. This best is illustrated in FIG. 2, which also shows the synergistic effect of tungsten on rhodium containing catalysts, and its specificity is illustrated by the lack of activity of $Pt + WO_x$ catalyst. The initial inlet gas composition in the example of this figure is 0.3 percent carbon monoxide, i.e., 3,000 p.p.m., the non-CO free feed gas case representing more stringent conditions and being more typical of reformer gas feeds.

Figure 3:
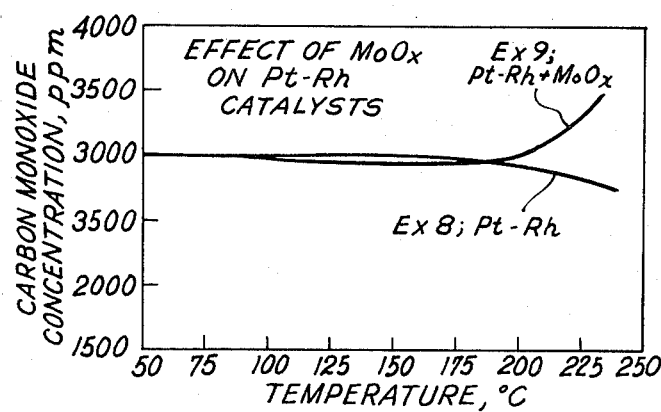
FIG. 3 shows the synergistic effect of molybdenum oxide on a catalyst of this invention.

FIG. 3 is the corresponding graph showing the synergism of $MoO_x$ for the $Rh - Pt$ catalysts. As seen therein, the catalyst using $MoO_x$ is active above about 200°C. Of course, in gases not initially containing carbon monoxide, the CO-shift of the carbon dioxide can proceed unhindered.

FIG. 4 illustrates the specificity of $MoO_x$ compared to $WO_x$ with $Ru - Pt$ catalyst system of this invention. While the tungsten oxide on a ruthenium-platinum alloy, hereinafter $Ru - Pt + WO_x$, does not show CO-shift activity, and indeed methanates CO to $CH_4$ in preference to CO-shift, the same alloy with $MoO_x$ shows high CO-shift activity above about 165°C. As noted above, the initial dip in the $Ru - Pt + MoO_x$ curve is due to low temperature methanation.

The temperature-flow rate relationship discussed above is shown in FIG. 5 for the $Rh - Pt + WO_x$ catalyst with CO-shift predominating above 175°C. At temperatures above about 250°C, the CO concentrations in the effluent at various flow rates tend to merge.

As noted above, the pure noble metals, ruthenium, rhodium and platinum, lack effectiveness in the process of this invention as methanation catalysts. The same is true of alloys of ruthenium and rhodium with platinum. Equally surprising, we have discovered that tungsten oxide has no appreciable effect on CO-shift capabilities of both ruthenium and platinum, while the combination with rhodium is highly active. $MoO_x$, which is ineffective to beneficate the catalysts for methanation shows synergism for CO-shift activity. Thus, the catalyst of this invention are highly specific.

Table 1 lists the combinations according to systems and admixtures.

TABLE 1. CATEGORIZATION OF CATALYSTS

|  | Metals | Mixed Metals | Admixtures $WO_x$ | $MoO_x$ |
|---|---|---|---|---|
| Rhodium System | Pt |  | $Pt + WO_x$ |  |
|  |  | Pt-Rh | $Pt-Rh + WO_x$ | $Pt-Rh + MoO_x$ |
|  | Rh |  | $Rh + WO_x$ |  |
| Ruthenium System | Pt |  | $Pt + WO_x$ |  |
|  |  | Pt-Ru | $Pt-Ru + WO_x$ | $Pt-Ru + MoO_x$ |
|  | Ru |  | $Ru + WO_x$ |  |

The following description of specific examples is illustrative of our invention, with curves in FIGS. 1–5 being related to the separate examples as indicated thereon.

The metal mixtures suitable for use as the catalysts in our process can be prepared by a straightforward procedure which involves the steps of initially admixing, in an aqueous environment, an alkali metal borohydride, such as sodium borohydride or potassium borohydride, and a mixture comprising: (a) rhodium or ruthenium halide, such as rhodium or ruthenium chloride, or rhodium or ruthenium bromide and (b) ammonium or an alkali metal matatungstate or molybdate, as the case may be. There results a coprecipitated catalyst mixture containing essentially active rhodium or ruthenium metal as well as reduced, amorphous oxide of tungsten or molybdenum. The resultant mixture is combined with (a) an aqueous dispersion of binder-waterproofing agent, such as polytetrafluoroethylene, polychlorotrifluoroethylene or polyethylene and (b) mineral oil to form a catalyst mixture paste of the same.

In general, a wide range of catalyst components can be used in our process. For instance, there is contemplated utilizing from about 80 percent to about 95 percent ruthenium or rhodium, and from about 5 percent to about 20 percent amorphous, reduced tungsten or molybdenum oxide on a weight basis. However, it has been found that for superior performance of the overall electrode a mixture comprising 85 percent rhodium or ruthenium and 15 percent reduced oxide is employed.

Advantageously, in the cases indicated, a portion of each of the aforementioned rhodium or ruthenium components may be substituted in the process of the invention. Thus, not more than up to about 50 percent of the rhodium or ruthenium metal content may be substituted by platinum. Accordingly, in the preparation of the catalyst used in our process, from 0 to 30 percent chloroplatinic acid, 30 to 60 percent rhodium or ruthenium halide and 40 percent ammonium metatungstate or molybdate can be admixed to recover a catalyst having the following composition:

|  | Percent |
|---|---|
| (a) Rhodium or ruthenium | 40 – 95 |
| (b) Platinum | 0 – 47.5 |
| (c) Reduced tungsten or molybdenum oxide | 5 – 20 |

The catalyst mixture paste was spread on a supporting grid or screen of stainless steel, tantalum or acrylic fiber paper and let dry to form a catalyst sheet. The amount of the mixed metal catalyst is preselected to provide from 5 to 40 mg. catalyst/cm² of the catalyst sheet. For testing purposes to best show the effectiveness at low catalyst loadings, 5 mg/cm² was used. For noble metals tests involving $Pt - Rh$ and $Pt - Ru$, the weight proportions of the Pt and the Ru or Rh were equal.

The reactors were a standard test cell having tantalum and stainless steel end plates, which were tested and found inert for the reactions. The dry catalyst sheet was placed against a 0.100 inch solid Teflon gasket and surrounded by a 0.100 inch Teflon frame gasket so that the area of the catalyst sheet was determined by the opening size of the frame gasket, 2×2 inch. The gasket-catalyst sheet was then secured between the end plates by bolts, and the catalyst sheet fixed in place against the solid Teflon gasket, inter alia, to prevent sagging, by means of standard expanded-metal tantalum screens in the frame gasket opening. With inlets and outlets in one end plate, the reaction presents a thin, wide chamber with one catalyzed wall. The catalyst sheet was not placed under any electrical potential and the entire cell was heated to, and maintained at the preselected temperature within the test range of 50 – 500°C.

In operation, either the standard test fuel gas or a reference gas (for calibrating the analyzing instrument) is admitted to the system through a pressure regulator and block valve. The gas passes through a flow-indicating rotameter and a flow regulator which control a constant, downstream flow rate, regardless of the upstream pressure. The gas then flows either to the test cell or to a bypass. Leaving the test cell, the gas goes either to a bubble flowmeter or to the gas analysis train. The bubble flowmeter is used to adjust the flow controller for each run. The gas analyzing equipment is calibrated with a reference and the standard test gas at the beginning of each run. In a given test, when the cell temperature stabilized, as controlled by a proportional temperature-indicating controller and verified by a strip-chart temperature recorder, the bypass valve is closed and the gas fed to the test cell for several minutes to establish steady-state conditions. The carbon monoxide contents in the effluent gas were then recorded as a function of temperature.

The gas compositions were determined by a sensitive infrared analyzer calibrated for the detection of carbon monoxide. The first unit in the analysis train is a Lira Model 200, manufactured by Mine Safety Appliances, Pittsburgh, Pennsylvania. It has three carbon monoxide ranges with full-scale sensitivities of 100, 500, and 5,000 p.p.m. CO. Although the lower range is direct reading, non-linearity exists in the upper two ranges so that calibration curves are required. When used with these curves, the Lira IR analyzer continuously monitors the carbon monoxide concentration in the flowing gas stream with an estimated accuracy of 2 percent of full scale.

The gas flow rate used in most of this work was 300 cu cm/min. except where rate of flow tests were run. This standard flow rate indicates the relative performances of the catalysts. The average residence time in the cell is approximately three-fourths second.

The primary feed gas was a simulated reformer product of 79.7% $H_2$, 20% $CO_2$, and 0.3% CO. Gas of this composition may be expected after reforming and shifting reactions with a high $H_2O/CH_4$ ratio in the feed to a reformer. In some tests, a reference gas containing 80 percent hydrogen and 20 percent carbon dioxide was used. This gas determines the effect of a carbon monoxide-free feed. Unless otherwise indicated, the tests were run with dry feed. The test runs were made over the temperature range of from 50°C to between 275 – 500°C, and the results were plotted as a series of best curves on the accompanying FIGS. 1–5. Where the noble metal was mixed with an oxide additive, it was present as 15 percent by weight.

In general, the relative capabilities of these catalysts in promoting the CO-shift were determined by the change in the CO concentrations in the effluent gas stream. $CH_4$ was also measured using a Lira Model 300 having a single range of 0 – 6,000 p.p.m. methane. An increase in CO content, without a decrease in the $CH_4$ level, indicates that the CO shift is occurring; accordingly, the $CH_4$ values are not shown on the graphs of FIGS. 1–5.

EXAMPLES 1 – 2

FIG. 1 shows the results from runs at temperatures from 50 to 225°C using $Rh - Pt + WO_x$ catalyst of composition 42.5:42.5:15 percent by weight and 5 mg/cm² loading on two different feed gases at a flow rate of 300 cc/min. as follows:

| Example 1 | 20% $CO_2$, 80% $H_2$ |
|---|---|
| Example 2 | 20% $CO_2$, 0.3% CO, 79.7% $H_2$ |

FIG. 1 shows that even in the presence of CO in the feed gas, the catalyst is highly active for the CO-shift, which predominates over the competing CO methanation above about 165°C. The presence of CO makes the CO-shift lag about 10°C behind the CO-free feed gas, as seen by comparing with the lower curve.

EXAMPLES 3 – 7

FIG. 2 shows the results from runs at temperatures from 50°C to over 250°C using the CO-containing feed and flow rate as in Example 2, with the Example 2 data being repeated thereon, as follows:

| Example 3 | $Rh + WO_x$, 85:15 % by weight, same loading as Examples 1 and 2 |
|---|---|
| Example 4 | Rh alone, same loading as Examples 1 and 2 |
| Example 5 | Pt alone, same loading as Examples 1 and 2 |
| Example 6 | $Pt + WO_x$, 85:15% by weight, same loading as Examples 1 and 2 |
| Example 7 | Pt - Rh, 50:50% by weight, same loading as Examples 1 and 2 |

By comparison of the data curves for the catalysts of Examples 4 – 7 with that of Example 3, the specificity of the catalysts of this invention is clear. Examples 4, 5 and 7 show the noble metals and alloys are inactive in our process. The comparison of Example 4 and 3 shows the synergistic effect of $WO_x$ on Rh, and the comparison with Examples 5 and 6 shows its specificity for Rh as compared to Pt. The comparison of Examples 2 and 3 shows the catalyst of Example 3 lags some 40 – 45°C behind the catalyst of Example 2, and both show predominant effectiveness as CO shift catalysts after the initial methanation dip.

EXAMPLES 8 AND 9

FIG. 3 is comparable to FIG. 2 except it shows the synergism of $MoO_x$ on a Rh – Pt alloy. The catalyst combination used was 42.5:42.5:15 percent by weight at the same loadings, flow rate and feed composition as in Examples 1 and 2. The effectiveness lower temperature limit is about 180°C for the CO-containing feed.

EXAMPLES 10 AND 11

FIG. 4 shows data curves for the following catalysts, at the conditions of loading, flow rate and feed gas composition of Examples 1 and 2:

| Example 10 | Ru - Pt + $MoO_x$ 42.5:42.5:15% by weight |
|---|---|
| Example 11 | Ru - Pt + $WO_x$ 42.5:42.5:15% by weight |

The comparison shows the specificity of activity of $MoO_x$ with the $Ru - Pt$ alloy as compared to the inactivity of $WO_x$. In addition, compared to Example 9, it shows that the $Rh - Pt + MoO_x$ catalyst is only slightly less effective than the $Ru - Pt + MoO_x$ and that $MoO_x$ is effective with both $Ru - Pt$ and $Rh - Pt$ alloys.

EXAMPLES 12 – 15

FIG. 15 shows the control of the output gas composition for the $Rh - Pt + WO_x$ catalyst, and loading and feed gas of Examples 1 and 2 under the following flow rate conditions:

| Example | Catalyst | Flow-Rate |
|---|---|---|
| 12 | $Rh - Pt + WO_x$ 42.5:42.5:15 | 100 cc/min |
| 13 | $Rh - Pt + WO_x$ 42.5:42.5:15 | 150 cc/min |
| 14 | $Rh - Pt + WO_x$ 42.5:42.5:15 | 300 cc/min |
| 15 | $Rh - Pt + WO_x$ 42.542.5:15 | 500 cc/min |

As can be seen from the data curves in FIG. 5, the CO content of the output gas can be determined by preselected control of the temperature and flow rate. Where high flow rate is used the CO content can be simply controlled by selecting temperature between about 175 through 250°C. Conversely, where a given temperature is preselected to be held constant, say 185°C, the flow rate can be cut down from 500 to 100 to cut the exit gas p.p. pm. of CO from about 2,500 to about 50. At higher temperatures the CO output values fro these flow rates tend to merge, indicating that the shift reaction at the higher temperature is sufficiently rapid to be relatively independent of residence time. For a 300 cc/min flow rate in the test cell, the reactor residence time is about three-fourths second, and this residence time may be varied from about 1/100 to 5 seconds. In the case of CO-free feed, the $CO_2$ will shift in a pattern of flow rate-temperature curves similar to the curves of FIG. 5.

EXAMPLES 16 AND 17 (COMPARISON)

In Example 3 of U.S. Pat. No. 3,357,863, the patentee shows the performance of Pt and $Pt - Rh + WO_x$ formed into fuel cell electrodes (anodes) in a phosphoric acid fuel operating at 150°C upon a CO containing fuel. To point up the unexpectedness of the novel use of the metal compositions in the process of this invention, comparison tests were made using both Pt (Example 16) and $Pt - Rh + WO_x$ (Example 17) catalyst sheets as prepared above in Examples 6 and 2 respectively under electrical conditions equivalent to those of the fuel cell shown in that Example 3 of U.S. Pat. No. 3,357,863, as follows:

The test cell size used in these two comparative examples was 2 inch by 2 inch, the same as used above. The cell was placed under a 2.78 Amp current drain at a current density of 100 A/sq.ft. The feed gas was as specified above, 0.3% CO, 20% $CO_2$ and 79.7% $H_2$, and was fed in at 107 cu cm/min. The effluent gas was exhausted from the test cell at a rate of 86 cu cm/min., the difference in flow rate being the hydrogen consumed in the operating fuel cell. The cell was operated at 150°C, and employed a 20 milligram Pt/cm² cathode operating on oxygen as the oxidant, and the methane and CO were measured at steady state conditions after several hours of operation.

Both the Pt and the $Pt - Rh + WO_x$ sheets, acting as anodes under the electrical conditions of these comparative test runs, Examples 16 and 17 respectively, showed no CO-shift under the steady state operating conditions, there being no significant change in the CO concentration in the fuel cell effluent, based on the close agreement of the measured CO concentration in the effluent with the value predicated by material balance. CO must be evaluated with reference to material balance since hydrogen is consumed in the manufacture of the electricity in the test fuel cell.

Although there was no net effective chemical reaction in the operating fuel cell, the electrochemical performance of the fuel cell of Example 16 differed significantly from that of Example 17. Both cells started at relatively low polarizations when switched from hydrogen to the CO-containing fuel. Polarization increased rapidly for both cells and leveled out at a value of about 40 millivolts for the pure platinum anode of Example 16. In the case of the mixed metal anode of Example 17, $Pt - Rh + WO_x$, the polarization maximized and then decreased to about 15 millivolts after prolonged operation. The polarization effect due to the dilution of the hydrogen with 20 percent carbon dioxide in this fuel cell is 13 millivolts, indicating that the net polarization due to poisoning by carbon monoxide was quite low on the anode of this comparative example. In the tests of Examples 16 and 17, the feed gas used was that above having 3,000 p.p.m. CO in addition to the $CO_2$ and $H_2$. While this gas was not identical to that of U.S. Pat. No. 3,357,863, the tests are entirely comparable because of the lower metal loading used in our catalyst and anode sheets. The patent calls for 20 – 40 mg/cm² loading for CO concentrations over 1 percent and 5 mg/cm² for 100 p.p.m. In the above comparative tests, Examples 18 – 21, we use only 5 mg/cm² at a CO concentration which is 30× the maximum indicated in the patent.

These results, Examples 6 and 2, compared to Examples 16 and 17, show that in the present use of the metals compositions under electrical conditions, they do not effectively shift $CO_2$ to CO in the feed gas. Based on this, our discovery of CO-shift in the process of this invention is quite unexpected.

In the examples cited above, the inlet CO concentration was below the thermodynamic equilibrium concentration in the temperature range of the catalyst activity; consequently, carbon monoxide was generated. The reaction $CO_2 + H_2 \rightleftarrows CO + H_2O$, being reversible is herein termed the CO-shift and includes production of CO or $CO_2$ depending on the inlet gas composition in relation to the equilibrium gas composition at the chosen operating temperature.

In addition to the catalyst sheets used in the specific examples above, the catalysts of this invention may be used in other forms, for example, deposited on alumina supports in granular, spherical, cylindrical or "saddle" forms. Likewise, other modifications may be made in the process of our invention without departing from the spirit thereof.

We claim:

1. A process of converting a feed gas containing a carbon oxide according to the CO-shift reaction: $CO_2 + H_2 \rightarrow CO + H_2O$, comprising the steps of:

a. passing said feed gas into contact with a catalyst in a reactor chamber, said catalyst being selected from:

1. mixtures of rhodium - platinum alloys with reduced amorphous tungsten oxide or molybdenum oxide,
2. rhodium with said tungsten oxide or said molybdenum oxide, and
3. ruthenium - platinum alloys with said molybdenum oxide, b. heating said chamber to a temperature within the range of 175 – 500°C to effect said reaction and produce CO-shift reaction products gas, and
c. removing said CO-shift reaction products gas from said chamber.

2. An improved CO-shift process as in claim 1 wherein said tungsten oxide or said molybdenum oxide is present in an amount of from 5 – 20 percent by weight of the catalyst total.

3. An improved CO-shift process as in claim 2 wherein said feed gas is fed into said chamber at a rate of up to about 1 liter/min.

4. An improved CO-shift process as in claim 2 wherein said platinum is present in an amount of up to 50 weight percent of the total weight of said alloys.

5. An improved CO-shift process as in claim 2, wherein said catalyst is selected from rhodium, and rhodium - platinum alloys, with said tungsten oxide.

6. An improved CO-shift process as in claim 5 wherein said tungsten oxide is present in said catalyst in an amount of about 15 percent by weight of the total weight of said catalyst.

7. An improved CO-shift process as in claim 2 wherein said feed gas contains both CO and $CO_2$.

8. An improved CO-shift process as in claim 2 wherein said feed gas contains $H_2$ but no CO.

9. An improved CO-shift process as in claim 2 wherein said feed gas contains $H_2O$ but no $CO_2$, and said CO-shift reaction products include $CO_2$.

10. An improved CO-shift process as in claim 2 wherein the CO content of said CO-shift reaction products gas is maintained at a preselected level by control of the feed gas reactor residence time and reactor temperature.

11. An improved CO-shift process of claim 2 wherein said temperature of said chamber is maintained between about 175°C and 275°C.

* * * * *